United States Patent
Gibson

(10) Patent No.: US 7,007,362 B2
(45) Date of Patent: Mar. 7, 2006

(54) METHOD OF FORMING A SLIP JOINT

(75) Inventor: Daniel W. Gibson, Maumee, OH (US)

(73) Assignee: Torque-TractionTechnologies, Inc., Maumee, OH (US)

( * ) Notice: Subject to any disclaimer, the term of this patent is extended or adjusted under 35 U.S.C. 154(b) by 185 days.

(21) Appl. No.: 10/426,146

(22) Filed: Apr. 29, 2003

(65) Prior Publication Data

US 2004/0216298 A1 Nov. 4, 2004

(51) Int. Cl.
*B23P 17/00* (2006.01)

(52) U.S. Cl. ............... 29/419.2; 29/421.1; 29/516; 29/517; 464/162; 72/54; 72/56

(58) Field of Classification Search ............ 72/54, 72/56, 59, 62; 464/162; 29/518, 517, 516, 29/419.2, 421.1
See application file for complete search history.

(56) References Cited

U.S. PATENT DOCUMENTS

| | | | |
|---|---|---|---|
| 3,293,884 A * | 12/1966 | Grob | ............... 464/162 |
| 3,848,325 A | 11/1974 | Bimba | |
| 4,063,208 A | 12/1977 | Bernatt | |
| 4,702,543 A | 10/1987 | Hager | |
| 5,442,846 A | 8/1995 | Snaper | |
| 5,671,522 A | 9/1997 | Aronne | |
| 5,964,127 A * | 10/1999 | Steingroever | ............... 72/56 |
| 6,015,350 A * | 1/2000 | Breese | ............... 464/162 |
| 6,484,384 B1 * | 11/2002 | Gibson et al. | ............... 29/516 |
| 6,698,076 B1 * | 3/2004 | Brissette et al. | ............ 29/421.1 |
| 6,754,943 B1 * | 6/2004 | Perry et al. | ................ 29/421.1 |

* cited by examiner

*Primary Examiner*—Marc Jimenez
*Assistant Examiner*—Jermie E. Cozart
(74) *Attorney, Agent, or Firm*—MacMillan, Sobanski & Todd, LLC

(57) ABSTRACT

A method of forming a slip joint includes providing a forming mandrel having a plurality of axially extending external splines, placing an inner tube circumferentially about the mandrel, and applying radially inward pressure on the inner tube to deform the inner tube and cause it to conform to the shape of the mandrel. The deformation step forms splines on the outer surface of the inner tube. A circumferential seal is then applied around the inner tube, and an outer tube is placed around the inner tube and the seal. Radially inward pressure is applied on the outer tube to deform the outer tube and cause it to conform to the shape of the inner tube, and thereby forming splines on the inner surface of the outer tube. The splines on the outer surface of the inner tube and the splines on the inner surface of the outer tube are configured to cooperate together to form a slip joint.

14 Claims, 7 Drawing Sheets

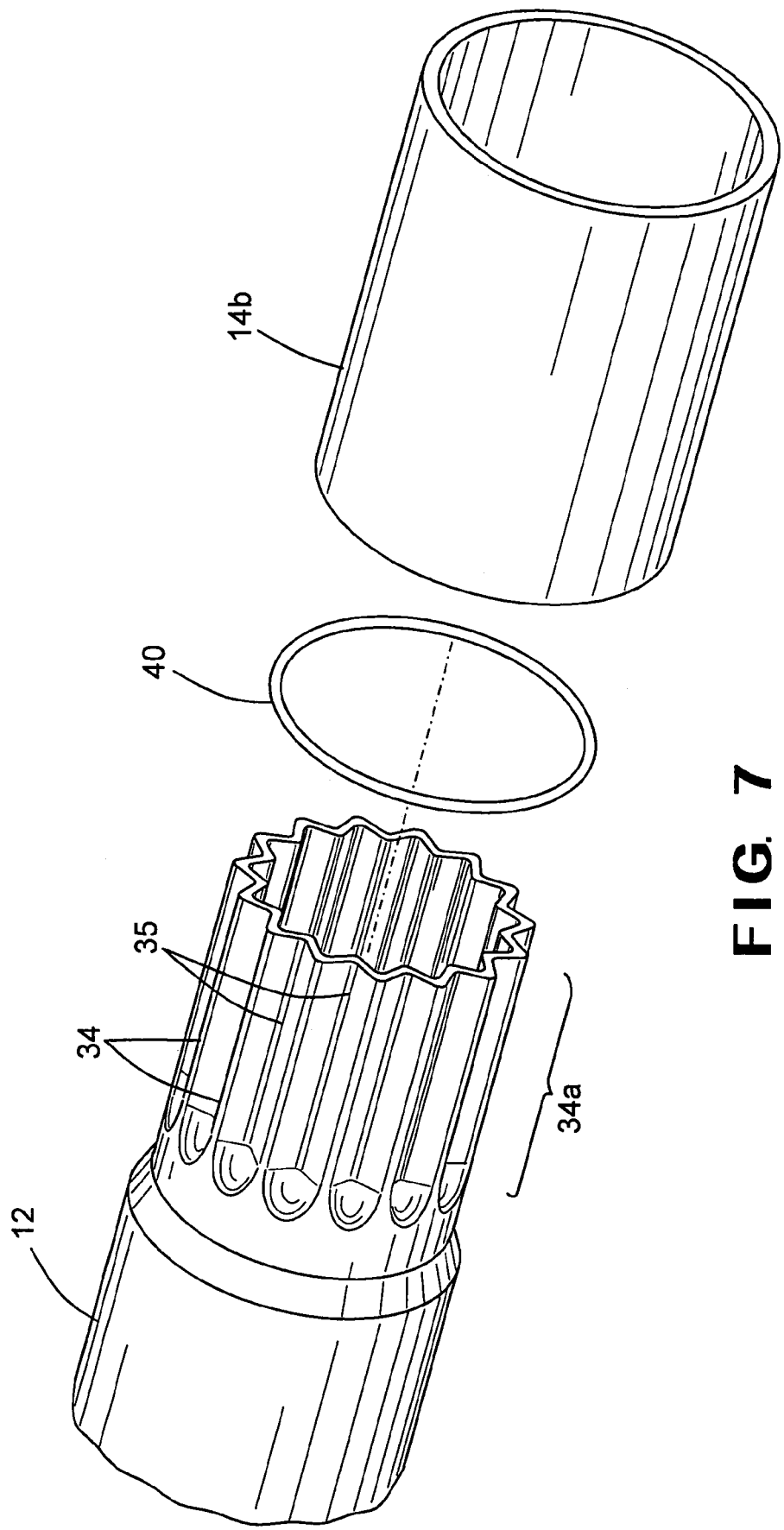

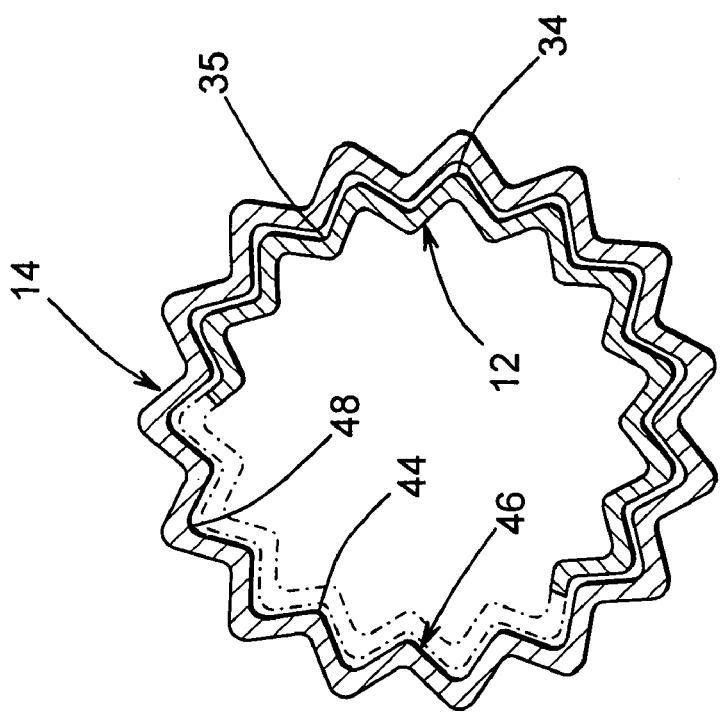
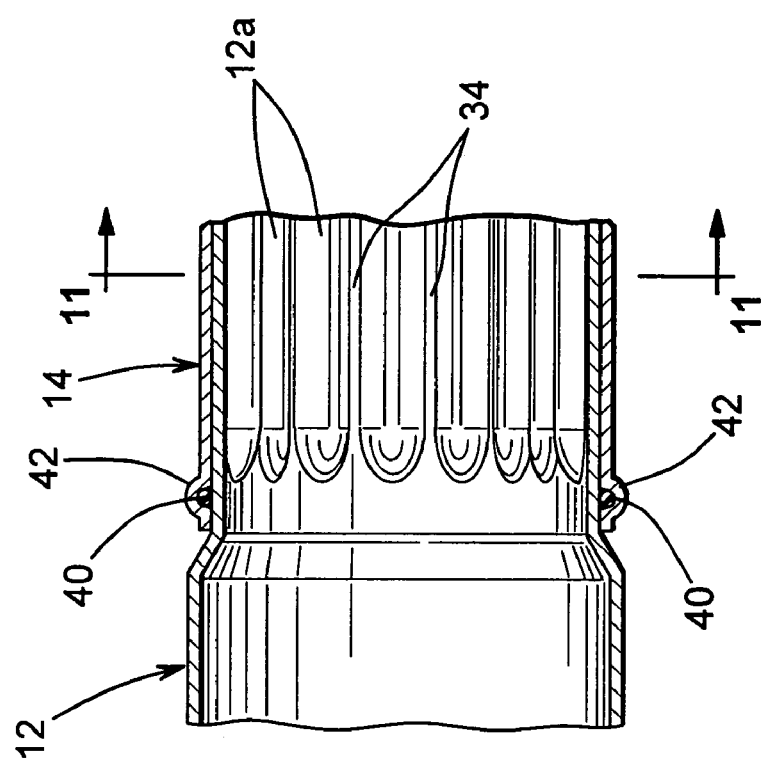

METHOD OF FORMING A SLIP JOINT

BACKGROUND OF THE INVENTION

This invention relates in general to vehicular driveshaft assemblies and in particular to a method of forming tubing around a tube seal during the manufacture of a splined connection between first and second members of a driveshaft assembly.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must a typical drive train system accommodate a limited amount of angular misalignment between the source of rotational power and the rotatably driven device, but it must also typically accommodate a limited amount of relative axial movement therebetween. For example, in most vehicles, a small amount of relative axial movement frequently occurs between the engine/transmission assembly and the axle assembly when the vehicle is operated. To address this, it is known to provide a slip joint in the driveshaft assembly. A typical slip joint includes first and second members that have splines formed thereon that cooperate with one another for concurrent rotational movement, while permitting a limited amount of axial movement to occur. One type of slip joint that is commonly used in conventional driveshaft assemblies is a sliding spline type slip joint.

A typical sliding spline type of slip joint includes male and female members having respective pluralities of splines formed thereon. The male member (often referred to as the yoke shaft) is generally cylindrical in shape and has a plurality of outwardly extending splines formed on the outer surface thereof. The male member may be formed integrally with or secured to an end of the driveshaft assembly described above. The female member (often referred to as the slip yoke), on the other hand, is generally hollow and cylindrical in shape and has a plurality of inwardly extending splines formed on the inner surface thereof. The female member may be formed integrally with or secured to a yoke that forms a portion of one of the universal joints described above. To assemble the slip joint, the male member is inserted within the female member such that the outwardly extending splines of the male member cooperate with the inwardly extending splines of the female member. As a result, the male and female members are connected together for concurrent rotational movement. However, the outwardly extending splines of the male member can slide relative to the inwardly extending splines of the female member to allow a limited amount of relative axial movement to occur between the engine/transmission assembly and the axle assembly of the drive train system.

As is well known in the art, most slip joint assemblies are provided with one or more seals to prevent the entry of dirt, water, and other contaminants into the region where the splined members engage one another. Such contaminants can adversely affect the operation of the slip joint assembly and cause premature failure thereof. Typically, such a seal includes a flexible boot having a lip portion that engages the outer cylindrical surface of the end portion of the slip yoke to prevent contaminants from entering into the inner splined region where the slip yoke engages with a mating splined component of the drive train assembly. Proper functioning and placement of the boot requires machining of both the male and female driveshaft members to provide an area for the boot to be attached to the driveshaft assembly in a secure manner that prevents contaminants from entering the lubricated area. Consequently, the additional machining makes the driveshaft assembly expensive to manufacture. Additionally, the boot is susceptible to failure because of its external positioning. Thus, it would be desirable to provide an improved method of sealing the driveshaft which inexpensively and efficiently protects the slip joint from contamination.

SUMMARY OF THE INVENTION

This invention relates to an improved method for forming tubing around a tube seal during the manufacture of a splined connection between first and second members of a driveshaft assembly. According to this invention there is provided method of forming a slip joint, the method including providing an inner tube having a plurality of axially extending external splines. A circumferential seal is applied around the inner tube, and an outer tube is placed around the inner tube and the seal. Radially inward pressure is applied on the outer tube to deform the outer tube and cause it to conform to the shape of the inner tube, and thereby forming splines on the inner surface of the outer tube. The splines on the outer surface of the inner tube and the splines on the inner surface of the outer tube are configured to cooperate together to form a slip joint. According to this invention there is also provided method of forming a slip joint, the method including providing a forming mandrel having a plurality of axially extending external splines, placing an inner tube circumferentially about the mandrel, and applying radially inward pressure on the inner tube to deform the inner tube and cause it to conform to the shape of the mandrel. The deformation step forms splines on the outer surface of the inner tube. A circumferential seal is applied around the inner tube, and an outer tube is placed around the inner tube and the seal. Radially inward pressure is applied on the outer tube to deform the outer tube and cause it to conform to the shape of the inner tube, and thereby forming splines on the inner surface of the outer tube. The splines on the outer surface of the inner tube and the splines on the inner surface of the outer tube are configured to cooperate together to form a slip joint.

Various objects and advantages of this invention will become apparent to those skilled in the art from the following detailed description of the preferred embodiment, when read in light of the accompanying drawings.

BRIEF DESCRIPTION OF THE DRAWINGS

FIG. 7 is an exploded perspective view showing the placement of a tube seal between the yoke shaft and a tube which will form the slip yoke.

FIG. 10 is a sectional elevational view similar to FIG. 9, showing the outer tube having been formed around the tube seal.

FIG. 11 is a sectional elevational view of the inner and outer tubes, taken along line 11—11 of FIG. 10, with a portion of the inner tube shown in phantom to better illustrate the outer tube.

DETAILED DESCRIPTION OF THE PREFERRED EMBODIMENT

Figure 1:
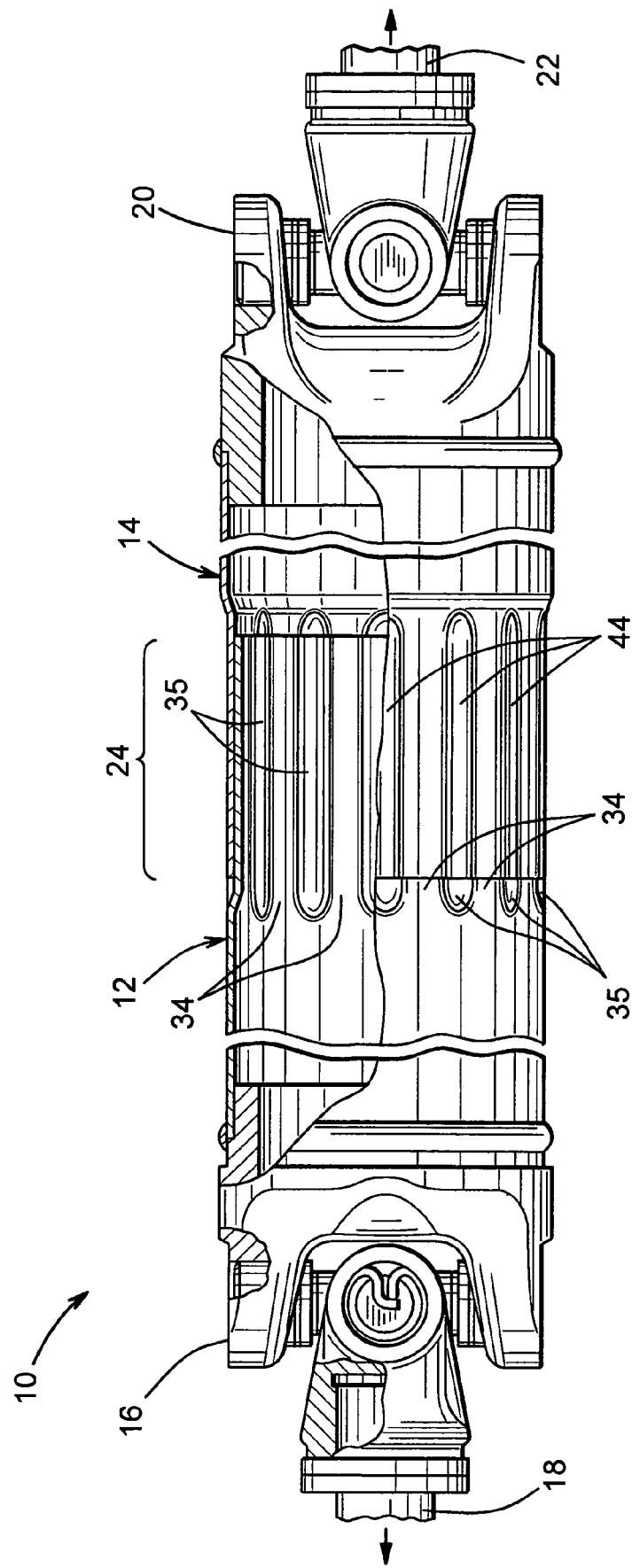
FIG. 1 is a side elevational view, partially in cross section, of a driveshaft assembly.

Referring now to the drawings, there is illustrated apparatus for carrying out the method for forming a slip joint in accordance with this invention. As shown in FIG. 1, a driveshaft assembly, indicated generally at 10, is composed of an inner tube 12, which is a yoke shaft, received in an axially overlapping or telescoping manner within an outer tube 14, which is a slip yoke. In the illustrated embodiment, the inner tube 12 is connected to the front universal joint 16, with the universal joint 16 being connected to the output shaft 18 of a transmission, not shown. The outer tube 14 is connected to the rear universal joint 20, which is connected to the input shaft 22 of an axle assembly, also not shown. If desired, however, the inner tube 12 may be connected to the rear universal joint 20, while the outer tube 14 is connected to the front universal joint 16.

The driveshaft 10 is generally hollow and cylindrical in shape, having an axial length which varies in accordance with the vehicle in which the driveshaft assembly 10 is used. Each of the inner tube 12 and the outer tube 14 extends for a portion of the total axial length, with a portion of the outer tube 14 and a portion of the inner tube 12 defining an axially overlapped or telescoping region, thereby forming a slip joint 24.

The inner tube 12 and the outer tube 14 of the driveshaft 10 can be formed from any suitable material or combination of materials. Typically, the inner tube 12 and the outer tube 14 of the driveshaft 10 are formed from steel or an aluminum alloy. Other materials, such as fiber reinforced composites or other combinations of metallic or non-metallic materials, may also be used. Suitable conventional methods for individually forming the inner tube 12 and the outer tube 14 of the driveshaft 10 are well known to persons skilled in the art.

Figure 2:
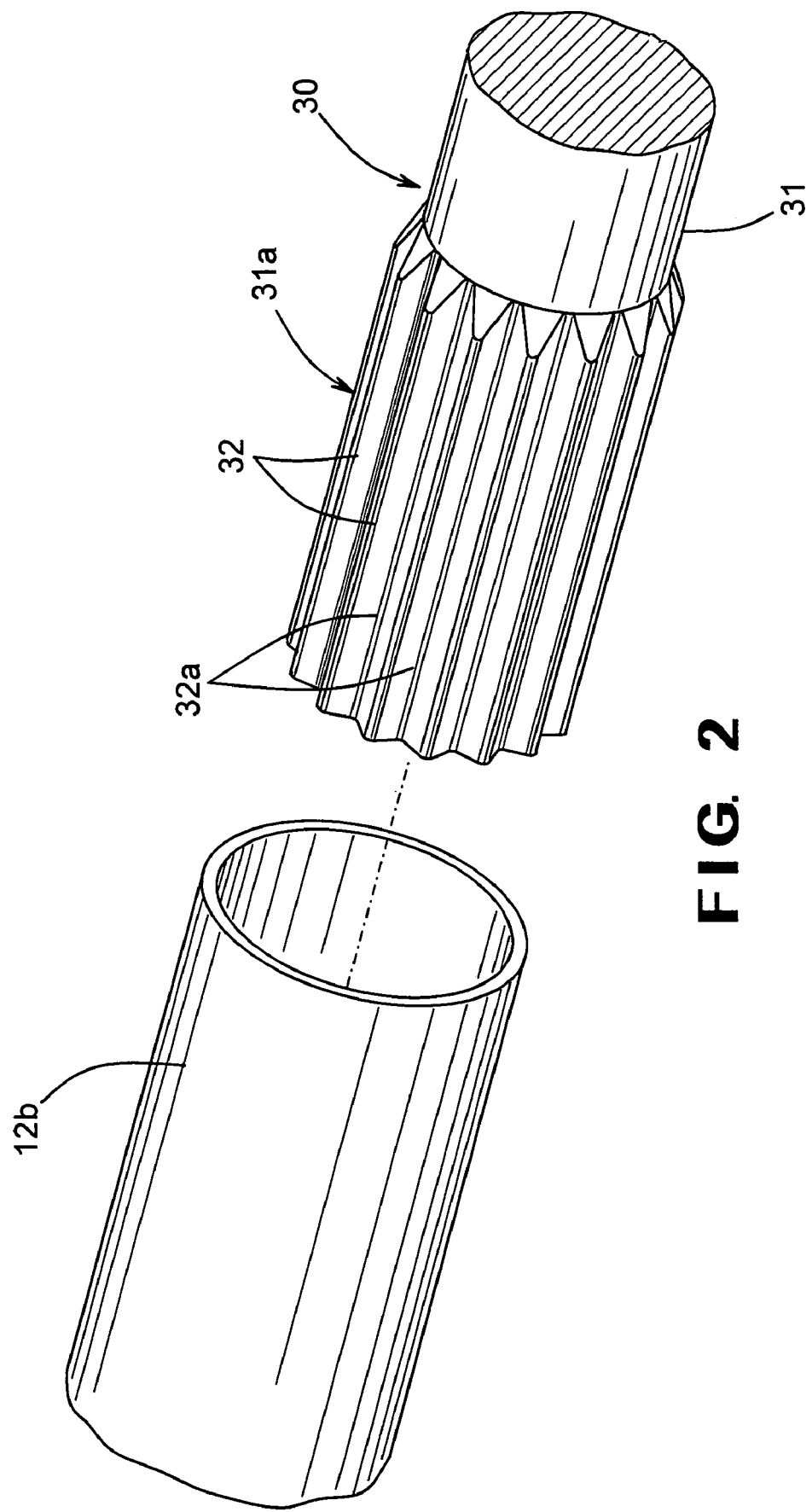
FIGS. 2 and 3 are perspective views showing the placement of a cylindrical tube about a forming mandrel prior to forming the tube into a yoke shaft.
Figure 3:
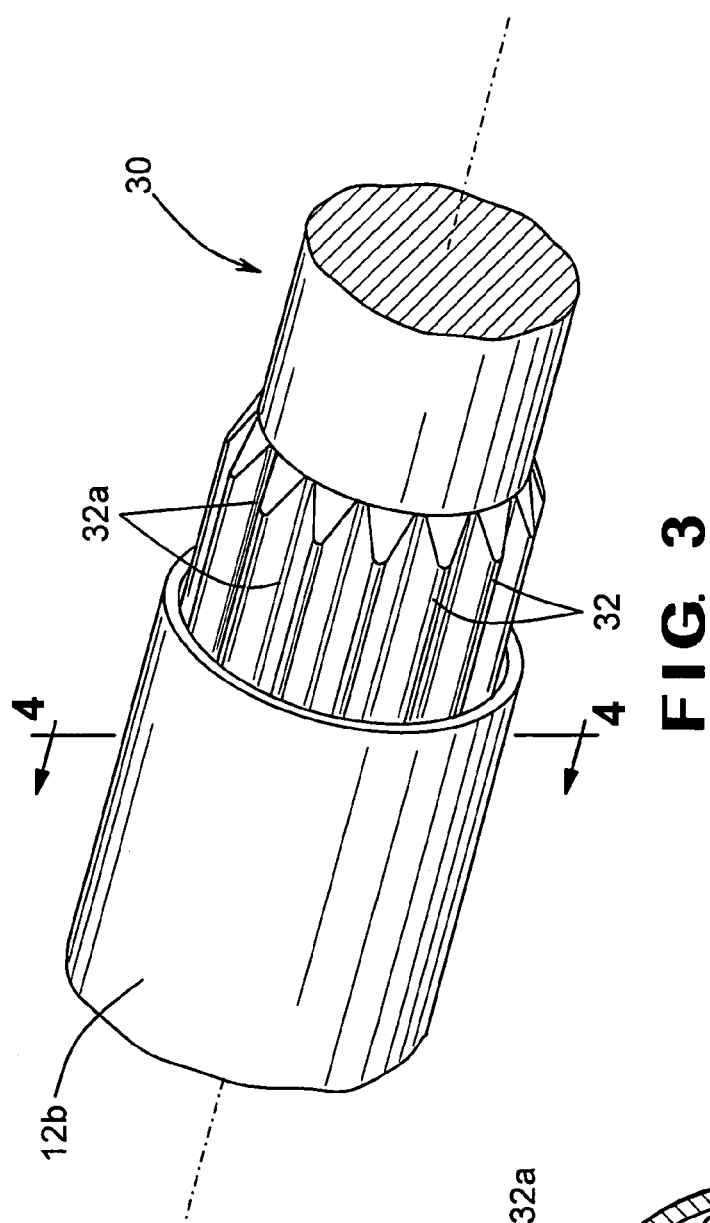
Figure 4:
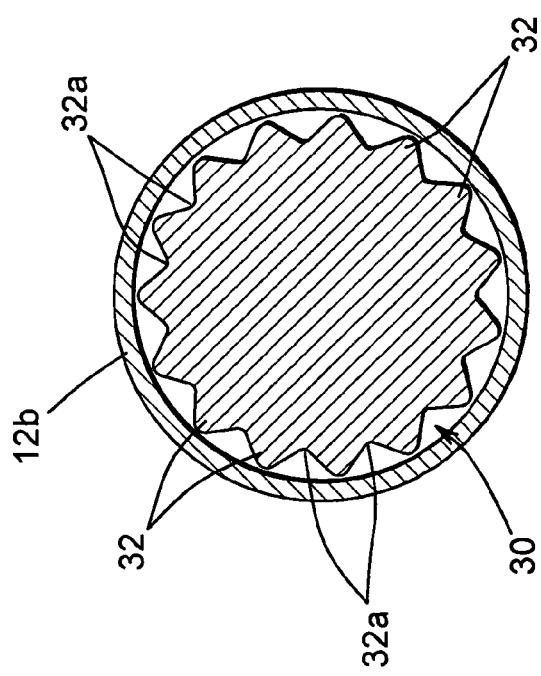
FIG. 4 is a sectional elevational view of the inner tube and mandrel of FIG. 3, taken along line 4—4.

As illustrated in FIGS. 2–4, the manufacture of the slip joint 24 according to the invention begins by placing a generally cylindrical inner tube blank 12b about a forming mandrel 30. The mandrel 30 contains a generally smooth, cylindrical shank portion 31 and a section 31a having a plurality of axially extending external splines 32. The splines 32 are separated by or defined by axial depressions 32a that alternate with the splines 32 around the circumference of the mandrel 30.

Figure 5:
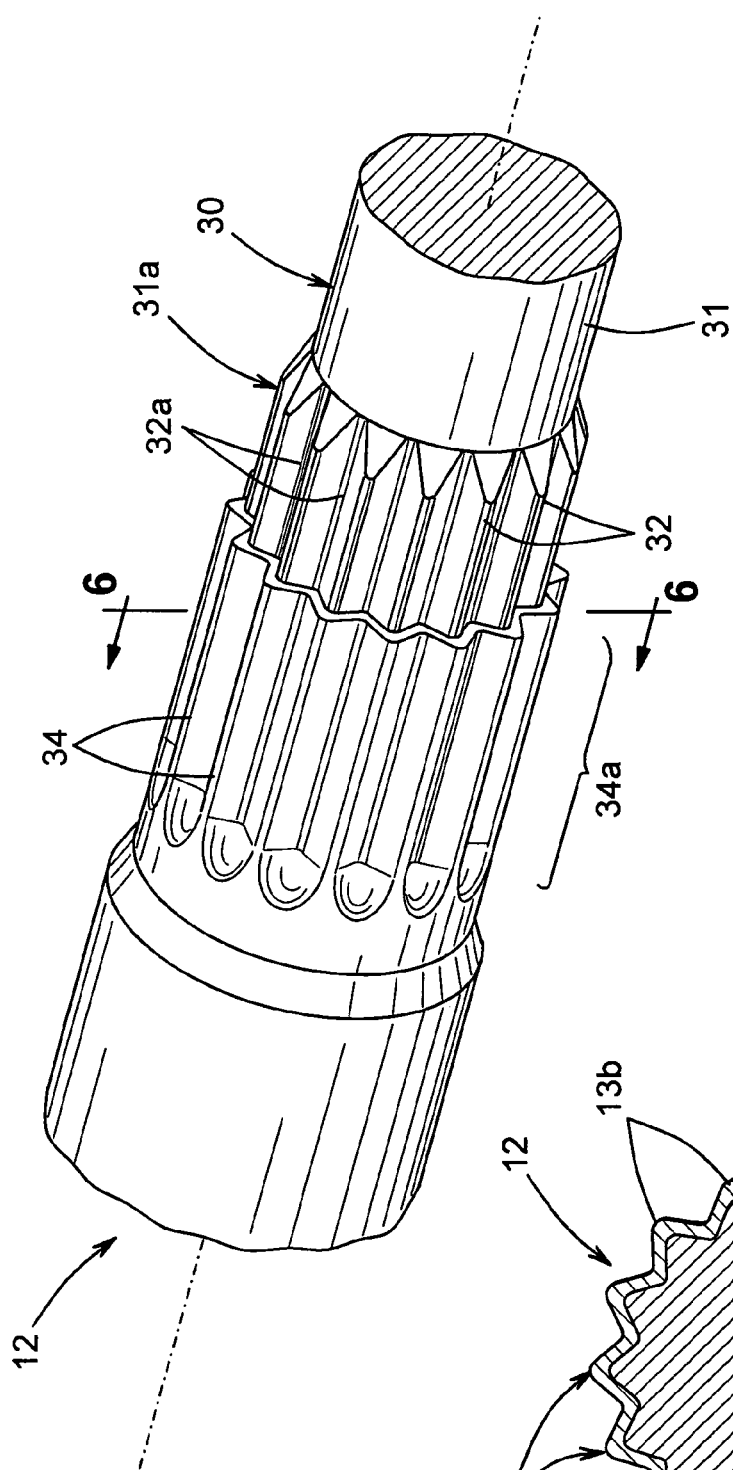
FIG. 5 is a perspective view showing the forming of the tube about the mandrel to form the yoke shaft.
Figure 6:
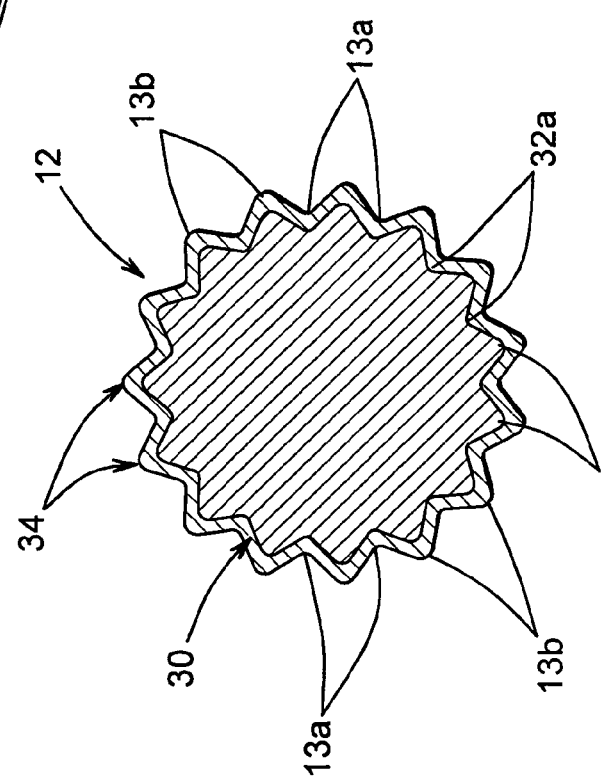
FIG. 6 is a sectional elevational view of the inner tube and mandrel of FIG. 5, taken along line 6—6.

The next step in the method is to reduce the diameter of portions of the inner tube blank 12a, typically by applying radially inward pressure on the inner tube blank 12b. The application of the external pressure reduces the diameter of portions of the inner tube blank 12b, bringing the inner tube blank 12b into intimate contact with the forming mandrel 30, and thereby causing the inner tube blank 12b to conform to or to assume the shape of the mandrel. This forming process converts the inner tube blank 12b into the inner tube 12, which contains splines 34 in a splined portion 34a, as shown in FIGS. 5 and 6. The pressure can be applied in several ways, such as by mechanical crimping, hydroforming and electromagnetic pulse forming.

As shown in FIGS. 5 and 6, portions 13a of the inner tube 12 corresponding to the axial depressions 32a of the mandrel 30 have been deformed radially inwardly upon the application of external pressure. The non-deformed regions 13b of the inner tube 12 extending between such radially inwardly deformed portions 13a constitute the external splines 34. In this manner, the splined inner tube 12 is formed. In an alternative embodiment of the invention, portions of the inner tube blank 12 are expanded radially outwardly, and those radially expanded portions constitute the external splines 34. Alternating circumferentially with the external splines 34 are inner tube axial depressions 35.

Figure 9:
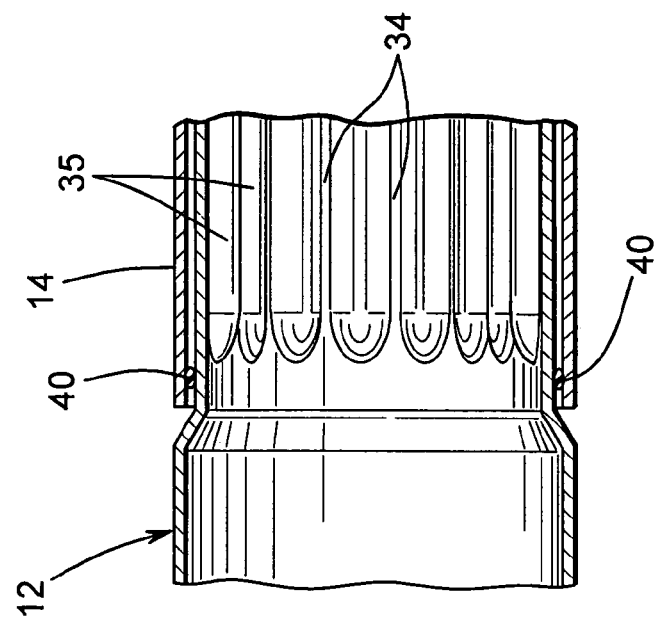
FIG. 9 is a sectional elevational view showing the placement of the tube seal and the outer tube over the inner tube prior to the forming operation.
Figure 8:
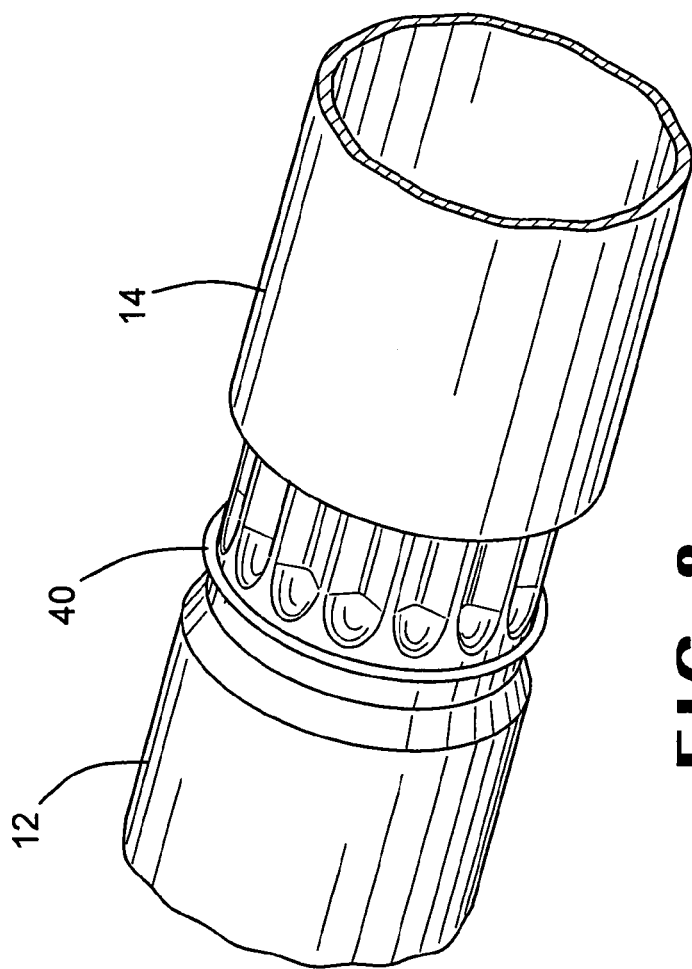
FIG. 8 is a perspective view showing the placement of the tube seal and the outer tube over the inner tube.

After the inner tube 12 is formed, the slip yoke or outer tube 14 is formed. First, according to a preferred embodiment of the invention, a tube seal 40 is placed about the inner tube 12, as shown in FIGS. 7–9. The tube seal 40 is preferably formed from a flexible, elastomeric material, such a synthetic rubber material, but can be made of any material suitable for providing a seal to prevent the introduction of dirt or contaminants from entering the cavity defined by the slip yoke or outer tube 14. An outer tube blank 14b is then disposed about both the splined portion 34a of the inner tube 12 and the tube seal 40. Preferably the clearance between the splined portion 34a and the inner surface of the outer tube 14 is sufficiently small that the tube seal 40 is compressed into a press fit relationship which provides a good seal between the inner tube 12 and the outer tube 14. Typically, the outer diameter of the inner tube 12 (as defined by the major diameter of the external splines 34) is only slightly smaller than the inner diameter of the outer tube 14.

After fitting the outer tube blank 14b telescopically over the inner tube 12 and tube seal 40 in this manner, portions of the outer tube blank 14b are then deformed radially inwardly about the inner tube 12, to form the outer tube 14, shown in FIGS. 10 and 11. The radially inward deformation of the outer tube 14 can be performed by any desired process, such as by electromagnetic pulse forming, mechanical crimping, hydroforming, and the like. The radially inwardly deformed portions of the outer tube 14 that extend between the external splines 34 of the inner tube 12 define internal splines 44 on the inner surface 46 of the outer tube 14. Thus, the outer tube 14 is conformed around the inner tube 12, thereby forming the complimentary internal splines 44. The inner surface 46 includes axial depressions 48 alternating with the splines 44. The axial depressions 48 correspond with the splines 34 of the inner tube 12 to form the slip joint 24.

During the deformation process for forming the splines 44 in the outer tube 14, the outer tube 14 is also deformed about the tube seal 40, thereby encasing the tube seal 40 in a circumferential or annular groove 42 in the outer tube 14, as shown in FIG. 10. By encasing the tube seal 40 in the outer tube 14, the slip joint 24 of the driveshaft 10 is protected from external contamination, such as dirt and water. Also, lubrication material within the interior of the slip joint 24 will be prevented by the seal 40 from leaking out or evaporating. Since the seal 40 is in place around the inner tube 12 during the forming of the outer tube 14, the seal will conform to the exterior surface of the inner tube 14. During operation of the slip joint, the seal 40 will wipe along the outer surface of the inner tube 14, thereby providing an effective seal over the entire range of travel of the slip joint 24.

Although the invention has been described as including the steps of first forming the inner tube 12 using the mandrel 30, and then forming the outer tube 14 by deforming it over the inner tube 12 with the tube seal 40 in place, it is to be understood that the invention can be carried our using an inner tube 12 formed in any other suitable manner, while still using the step of forming the outer tube 14 by deforming it over the inner tube 12 with the tube seal 40 in place.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of forming a slip joint comprising:
    providing an inner tube having splines on its outer surface;
    applying a circumferential seal around the inner tube;
    placing an outer tube around the inner tube and the seal; and
    applying radially inward pressure on the outer tube to deform the outer tube and cause it to conform to the shape of the inner tube, thereby forming splines on the inner surface of the outer tube, and further to form an annular groove on the inner surface of the outer tube that encases the seal, wherein the splines on the outer surface of the inner tube and the splines on the inner surface of the outer tube are configured to cooperate together to form a slip joint.

2. The method of claim 1 in which the tube seal is formed from a flexible, elastomeric material.

3. The method of claim 1 in which the spacing between the inner tube and the outer tube sufficiently small that the tube seal is compressed into a press fit relationship prior to the forming of the outer tube.

4. The method of claim 1 in which the radially inward pressure on the outer tube to deform the outer tube is supplied by electromagnetic pulse forming.

5. The method of claim 1 in which the outer tube is generally cylindrical prior to its being placed about the inner tube.

6. A method of forming a slip joint comprising:
    providing a forming mandrel having a plurality of axially extending external splines;
    placing an inner tube circumferentially about the mandrel;
    applying radially inward pressure on the inner tube to deform the inner tube and cause it to conform to the shape of the mandrel, and thereby forming splines on the outer surface of the inner tube;
    applying a circumferential seal around the inner tube;
    placing an outer tube around the inner tube and the seal; and
    applying radially inward pressure on the outer tube to deform the outer tube and cause it to conform to the shape of the inner tube, thereby forming splines on the inner surface of the outer tube, and further to form an annular groove on the inner surface of the outer tube that encases the seal, wherein the splines on the outer surface of the inner tube and the splines on the inner surface of the outer tube are configured to cooperate together to form a slip joint.

7. The method of claim 6 in which the tube seal is formed from a flexible, elastomeric material.

8. The method of claim 6 in which the spacing between the inner tube and the outer tube is sufficiently small such that the tube seal is compressed into a press fit relationship prior to the forming of the outer tube.

9. The method of claim 6 in which the radially inward pressure on the outer tube to deform the outer tube is supplied by electromagnetic pulse forming.

10. The method of claim 6 in which the inner tube is generally cylindrical prior to its being placed about the mandrel.

11. The method of claim 6 in which the outer tube is generally cylindrical prior to its being placed about the inner tube.

12. A method of manufacturing a slip joint comprising:
    (a) providing a first member having a splined portion and a non-splined portion;
    (b) disposing a seal in an axially overlapping manner relative to the non-splined portion of the first member;
    (c) disposing a second member in an axially overlapping manner relative to the splined portion and the non-splined portion of the first member; and
    (d) deforming a first portion of the second member into engagement with the splined portion of the first member so as to provide a splined portion on the second member that allows the second member to move axially relative to the first member, and deforming a second portion of the second member into engagement with the seal and the non-splined portion of the first member.

13. The method defined in claim 12 wherein said step (a) is performed by providing a first member having an externally splined portion and an external non-splined portion; said step (b) is performed by disposing a seal about the external non-splined portion of the first member; said step (c) is performed by disposing a second member about the externally splined portion and the external non-splined portion of the first member; and said step (d) is performed by deforming a first portion of the second member inwardly into engagement with the externally splined portion of the first member and a second portion of the second member inwardly into engagement with the seal and the external non-splined portion of the first member.

14. The method defined in claim 12 wherein said step (a) is performed by providing a first member having an internally splined portion and an internal non-splined portion; said step (b) is perfonned by disposing a seal within the internal non-splined portion of the first member; said step (c) is performed by disposing a second member within the internally splined portion and the internal non-splined portion of the first member; and said step (d) is performed by deforming a first portion of the second member outwardly into engagement with the internally splined portion of the first member and a second portion of the second member outwardly into engagement with the seal and the internal non-splined portion of the first member.

* * * * *